United States Patent [19]

Vest

[11] Patent Number: 5,351,867
[45] Date of Patent: Oct. 4, 1994

[54] ARM STEADY BRACE

[76] Inventor: Clyde L. Vest, 119 Deepwood Ave., Beckley, W. Va. 25801

[21] Appl. No.: 68,850

[22] Filed: May 28, 1993

[51] Int. Cl.⁵ ............................................. A47F 5/00
[52] U.S. Cl. .................................. 224/224; 224/269; 224/916; 248/188; 248/286; 248/354.3; 42/94; 124/89
[58] Field of Search ...................... 248/188, 188.5, 125, 248/161, 423, 410, 412, 291, 286, 354.3; 224/269; 42/94; 124/88, 89

[56] References Cited

U.S. PATENT DOCUMENTS

| | | |
|---|---|---|
| 46,365 | 2/1865 | Kinman . |
| 281,338 | 7/1883 | Butler . |
| 454,300 | 6/1891 | Sproul . |
| 664,979 | 1/1901 | Taylor . |
| 759,593 | 5/1904 | Cover . |
| 784,390 | 3/1905 | Dunham . |
| 798,734 | 9/1905 | King . |
| 1,406,827 | 2/1922 | Dumas . |
| 1,883,465 | 10/1932 | Balmer . |
| 1,890,423 | 12/1932 | Teagarden ............................ 42/94 |
| 2,172,178 | 9/1939 | Rosenberg . |
| 2,474,050 | 6/1949 | Harris . |
| 2,849,249 | 8/1958 | Fridolph ........................ 248/412 X |
| 3,390,447 | 7/1968 | Galbraith . |
| 4,515,301 | 5/1985 | A'Costa . |
| 4,575,964 | 3/1986 | Griffin . |
| 4,674,472 | 6/1987 | Reis . |
| 4,844,390 | 7/1989 | Duke . |
| 4,882,869 | 11/1989 | Webster ................................. 42/94 |
| 5,094,418 | 3/1992 | McBarnes, Jr. et al. ........... 248/286 |
| 5,111,983 | 5/1992 | Simmons et al. . |

FOREIGN PATENT DOCUMENTS

| | | |
|---|---|---|
| 1048511 | 1/1959 | Fed. Rep. of Germany . |
| 8900111 | 1/1989 | PCT Int'l Appl. . |

Primary Examiner—Blair M. Johnson
Attorney, Agent, or Firm—Richard C. Litman

[57] ABSTRACT

An arm steady rest provides support of the arm, particularly the forearm and/or wrist, of a person holding a relatively heavy or bulky article (e.g., rifle, archery bow, video camera, etc.). The arm rest is attachable to the belt or clothing of the user, or may be tied or strapped to the user, or used as a monopod resting upon another surface. The brace arm of the device telescopes, and moreover provides for axial motion of the two telescopes elements relative to one another while they are longitudinally locked at a fixed length. Adjustability is provided for both the upwardmost and downward-/forwardmost positions of the brace arm while in the extended position. The device may be drawn from the downward or retracted position to the upwardly extended position and locked therein, or vice versa, with one simple motion of one hand; no additional manipulation of other components is required. Frictional security is provided to hold the brace arm in the downward position when not in use.

13 Claims, 3 Drawing Sheets

ARM STEADY BRACE

FIELD OF THE INVENTION

The present invention relates generally to bodily braces and supports, and more specifically to a brace attachable to the wearer's body or apparel and providing for the steadying of an extended arm of the wearer, particularly the forearm or wrist for shooting, hunting, or other purposes.

BACKGROUND OF THE INVENTION

It is well known that the extended support of an article by a person's arm or arms, is quite fatiguing. One of the first symptoms of such fatigue is the inability to hold the article (e.g., rifle or other weapon) steadily, as is required for shooting. Due to the principle of moment, either the greater the extension or the greater the weight supported, the greater and more rapid is the onset of arm fatigue.

Accordingly, various devices have been constructed in the past to provide support or bracing for a person's arm, as will be discussed below in the Description of the Prior Art. However, due to the attachment means, locking means, or other features, none of those devices are seen to provide the advantages of the present invention.

What is needed is an arm brace adaptable for use by archers or shooters for the support of the extended forearm, which brace is quickly and easily attachable to and removable from the body or apparel of the user. The brace must provide for single handed raising and lowering, in order that handicapped persons may use it for shooting as well. In addition, the brace must lend itself to other uses, such as in the support of a hand held video camera, as well as other articles. Moreover, use of the brace as a monopod when not attached to the user's apparel should also be possible.

DESCRIPTION OF THE PRIOR ART

U.S. Pat. No. 46,365 issued to Seth Kinman on Feb. 14, 1865 discloses an Arm-Supporter For Riflemen which must be attached to the user's body by means of three separate encircling straps. A generally vertical element extends upward to the area of the arm pit of the user, with a swivel or "U" joint at the upper end securing an extension for the support of the upper arm. No support of the lower arm is provided, and the complexity of the device precludes wide adaptability, as in the case of the present invention.

U.S. Pat. No. 281,338 issued to William J. Butler on Jul. 17, 1883 discloses an Arm Rest having a similar structure and limitations to those of the Kinman device discussed above.

U.S. Pat. No. 454,300 issued to R. B. Sproul on Jun. 16, 1891 discloses a Gunner's Arm Rest including surrounding waist and shoulder belts. Again, the device is cumbersome to use due to the numerous belts and straps involved and is limited in versatility.

U.S. Pat. No. 664,979 issued to Marion Taylor on Jan. 1, 1901 discloses an Arm Rest For Firearms including an encircling waist belt and generally vertical extension, in the manner of the Butler and Kinman devices discussed above.

U.S. Pat. No. 759,593 issued to John E. Cover on May 10, 1904 discloses a Gunner's Arm Rest having a loop which encircles a user's belt. The belt must be removed to install the attachment loop thereon. The single extension arm is adjustable in length, but when the adjustment is locked, the arms are rotationally as well as axially locked to one another, unlike the present invention.

U.S. Pat. No. 784,390 issued to William S. Dunham on Mar. 7, 1905 discloses an Arm Rest similar to the Butler and Kinman devices discussion above.

U.S. Pat. No. 798,734 issued to James C. King on Sep. 5, 1905 discloses an Arm support And Brace similar to the Butler and Kinman devices discussed above.

U.S. Pat. No. 1,406,827 issued to Allie W. Dumas on Feb. 14, 1922 discloses a Belt Gun Rest using a loop to secure the device around the belt of a user, in the manner of the Cover device discussed above. Telescoping adjustment of the support arm is also in the manner of the Cover device, providing no rotary motion of one arm relative to the other when locked.

U.S. Pat. No. 1,883,465 issued to Harry T. Balmer on Oct. 18, 1932 discloses a Rifle Support comprising a parallelogram linkage between the rifle and a palm supported grip. No means providing for attachment to the user's body or apparel is disclosed, nor is any means disclosed for the support of the arm of the user.

U.S. Pat. No. 2,172,178 issued to Abraham Rosenberg on Sep. 5, 1939 discloses an Adjustable Arm Support to be disposed between the knee and elbow of the user. No means for attachment to the user's body or apparel is provided, and moreover the telescoping means fails to provide for the axial rotation of the two telescoping elements relative to one another.

U.S. Pat. No. 2,474,050 issued to Herbert H. Harris on Jun. 21, 1949 discloses an Armrest having an attachment which straps to the elbow near the arm and including a knee pad, with a telescoping extension therebetween. No means is provided for axial rotation of the telescoping members. While a belt clip is disclosed, the clip is merely for storage of the device on a belt when the device is not in use.

U.S. Pat. No. 3,390,477 issued to Jack O. Galbreath on Jul. 2, 1968 discloses a Supporting Device For Sighting Firearms, comprising multiple straps securing an upper arm support to the user and a belt clip, with a telescoping member therebetween. The plural straps and failure of the telescoping means to provide for axial rotation between telescoping members, renders the device unlike the present invention.

U.S. Pat. No. 4,515,301 issued to Anthony A'Costa on May 7, 1985 discloses a Handgun Accuracy Control Harness comprising a plurality of flexible straps disposed about the back and over one shoulder of the user. Due to the flexible nature of the straps, the device cannot provide any support in compression.

U.S. Pat. No. 4,575,964 issued to Donnie R. Griffin on Mar. 18, 1986 discloses a Gun rest providing support for a rifle from the user's knee. No means of securing the device to the user's body or apparel is disclosed. While telescoping means is disclosed for the intermediate portion of the article, the telescoping components are axially as well as longitudinally locked when they are secured together. In addition, while the device is shown as a monopod support, the arcuate shape of the lower support bracket fails to provide needed stability.

U.S. Pat. No. 4,674,472 issued to Daniel S. Reis on Jun. 23, 1987 discloses a Bow Hip Rest directly attachable to an archery bow with an opposite end adaptable to resting on the user's hip. Telescoping is provided by means of treaded adjustment, but when locked, no axial rotation is permitted.

U.S. Pat. No. 4,844,390 issued to Henry Duke on Jul. 4, 1989 discloses a Hunter's Portable Arm Rest including a belt clip and telescoping means for a support element. Again, no axial rotation of the telescoping members relative to one another is provided when they are locked together.

U.S. Pat. No. 5,111,983 issued to Elex M. Simmons et al. on May 12, 1992 discloses a Camera Stabilizing Device including a belt clip and an additional strap securable around the user's back and one shoulder and providing tension to hold the arm support at the proper distance from the user's body. No telescoping means is provided, nor is any support of the forearm or wrist provided.

West German Pat. No. 1,048,511 to Heinrich Katzfey and published on Jan. 8, 1959 discloses a Chin Support for use while reading. The device straps around the head, and no adjustment means is disclosed.

Finally, International Pat. No. WO 89/00111 to Seppo Holtta and published on Jan. 12, 1989 discloses a Device For Supporting Of The Hand and permanently secured to a table or other structure. The device includes a parallelogram intermediate portion, with elevation adjustment of the parallelogram mechanism. No support of the device by the user or any telescoping means is disclosed.

None of the above noted patents, taken either singly or in combination, are seen to disclose the specific arrangement of concepts disclosed by the present invention.

SUMMARY OF THE INVENTION

By the present invention, an improved arm steady brace is disclosed.

Accordingly, one of the objects of the present invention is to provide an improved arm brace which provides for the steadying of the user's arm, thereby serving to reduce fatigue while the user is supporting another hand held article.

Another of the objects of the present invention is to provide an improved arm brace which is attachable or securable to the body or apparel of the user.

Yet another of the objects of the present invention is to provide an improved arm brace which includes means providing for telescoping extension of the support arm, and further allows axial rotation of the telescoping elements relative to one another when the telescoping elements are longitudinally secured.

Still another of the objects of the present invention is to provide an improved arm brace which includes means providing for the securing of the brace arm in a folded, downward position and also provides means for locking the brace arm in an upwardly and outwardly extended position without manipulation of other elements than the brace arm.

A further object of the present invention is to provide an improved arm brace which is adaptable for use by hunters and other users of firearms, archers, users of video cameras, and other hand held devices which require steady holding.

An additional object of the present invention is to provide an improved arm which is adaptable for use as a monopod rest upon a fixed surface.

Another object of the present invention is to provide an improved arm brace which also provides for adjustment of the maximum and minimum cantilever angles of the brace arm.

A final object of the present invention is to provide an improved arm brace for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENT

Figure 1:
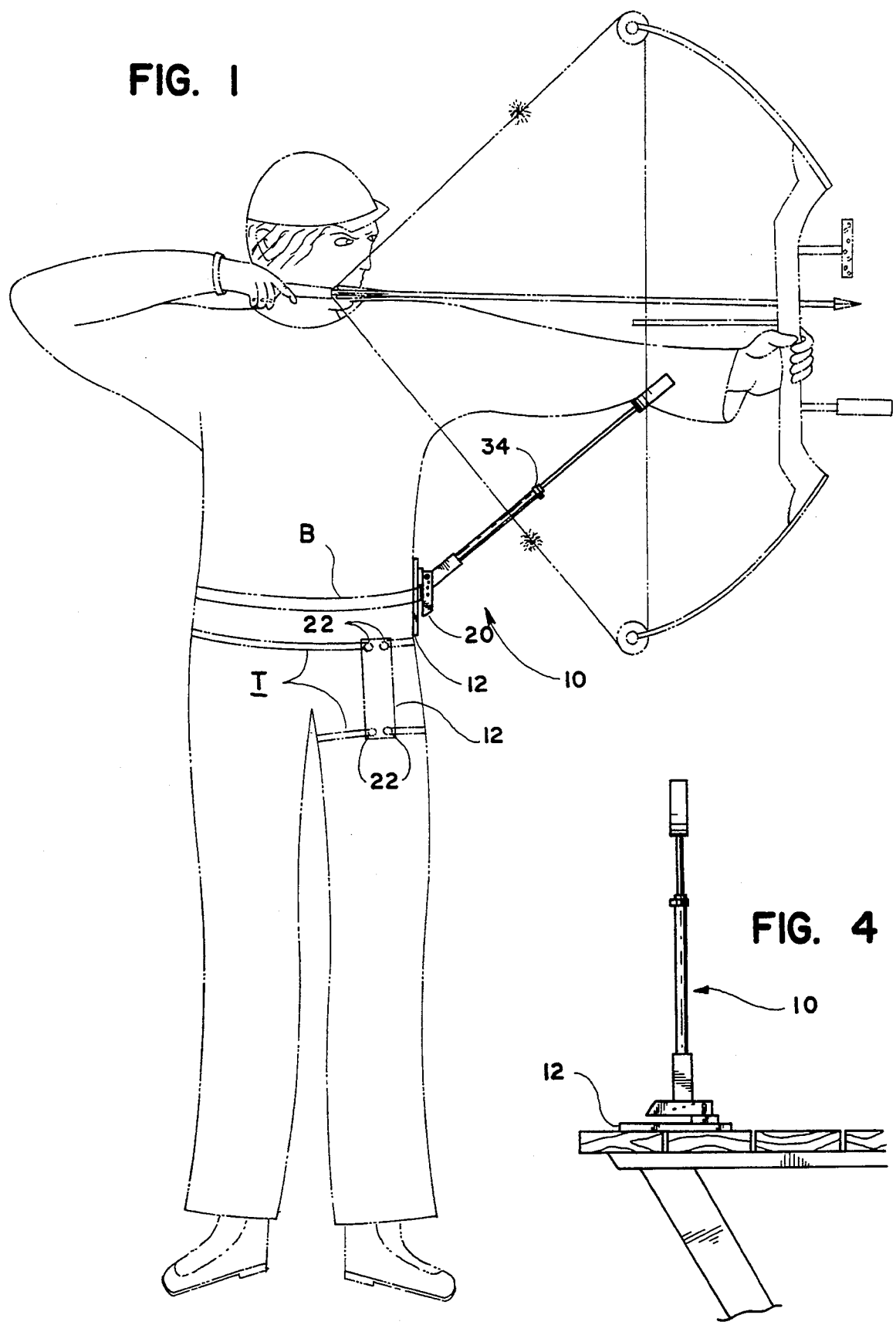
FIG. 1 is a side elevation view of the present invention in use as a forearm support for an archer, and showing alternative means of securing to the body or apparel of the user.
Figure 4:
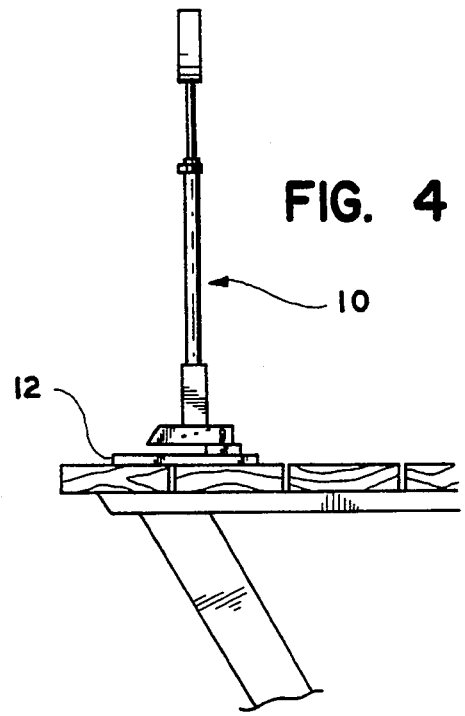
FIG. 4 is an alternative mounting arrangement to those shown in FIG. 1.

Referring now to the drawings, the present invention will be seen to relate to an arm steady brace 10 for use in supporting the arm, particularly the forearm and wrist, as shown in FIG. 1, or adaptable for use as a monopod and supported by another structure as shown in FIG. 4. While FIG. 1 shows the present invention in use as an arm support for an archer, it will be understood that the arm steady brace 10 of the present invention is not limited to such use, but may be used to support the arm of a user who is required to support virtually any load by means of an extended or partially extended arm.

Figure 2:
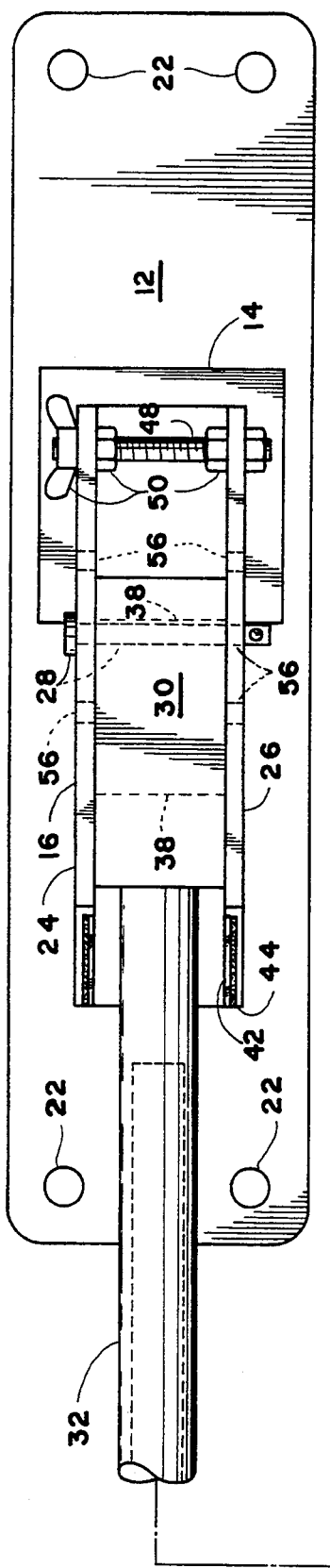
FIG. 2 is a plan view in three sections, showing various details of the construction and function of the present arm brace.
Figure 2:
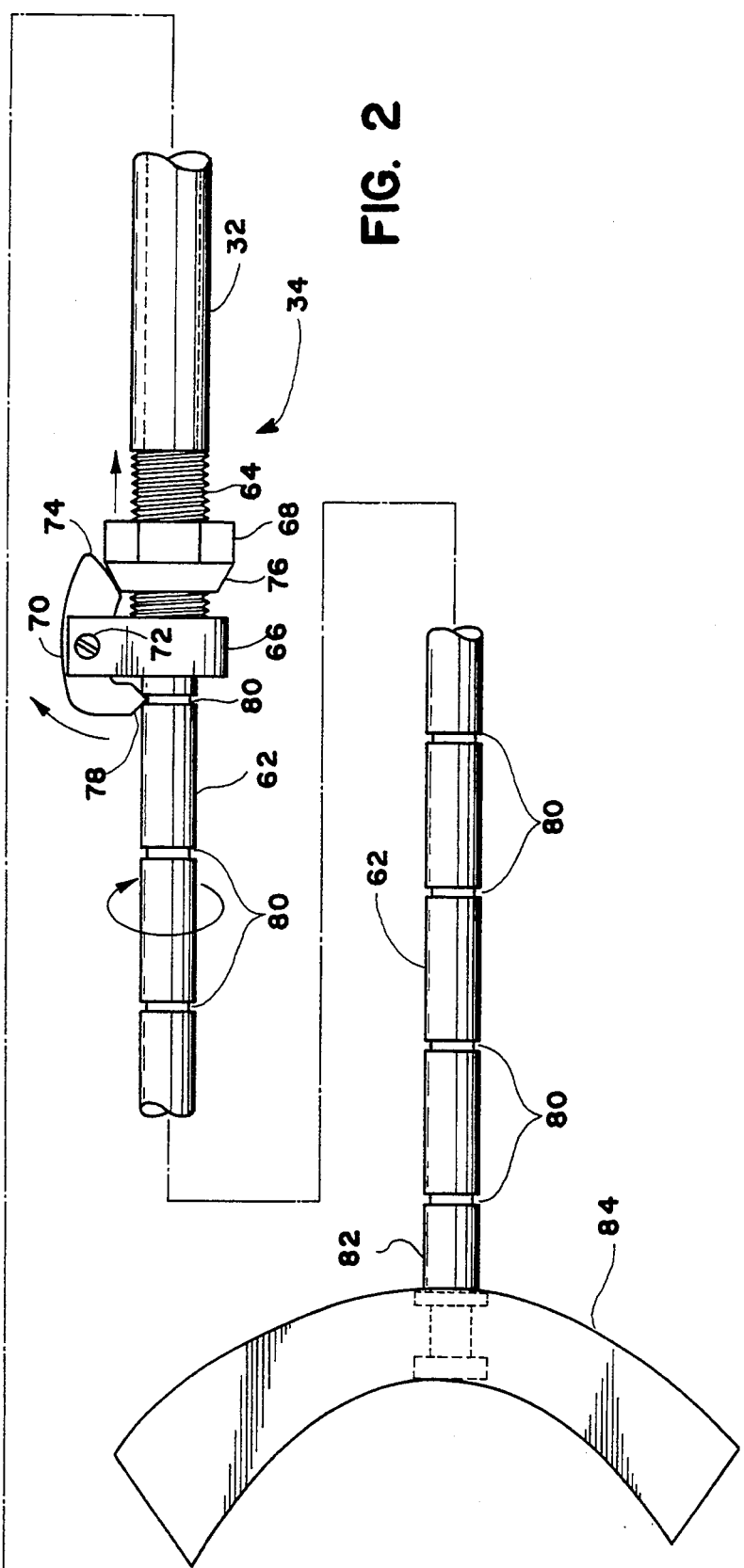

FIG. 2 provides a detailed view of the structure of the present invention. A flat, planar base 12 provides support for a smaller intermediate portion 14 which in turn provides support for a brace arm channel 16, which includes a base 18 (FIG. 3) which extends from the intermediate portion 14 to lie parallel to the base 12. The space between the channel base 18 and the arm brace base 12 provides a slot 20, which provides for the suspension of the arm steady brace 10 from a user's belt B or other article, as shown in FIG. 1. Alternative attachment means are also shown in FIG. 1, provided by the holes 22 at the edges of the base 12. Holes 22 provide for ties T, pins (not shown) or other means to secure the present invention to the user or user's apparel.

Channel 16 includes opposed first and second side walls 24 and 26, extending upward from each edge of the channel base 18. A transverse retaining pin 28 is installed therethrough, serving to retain an attachment component 30 for the first member 32 of the brace arm 34. Brace arm attachment component 30 may be formed of a generally rectangular solid shaped material, as shown, and includes a threaded or otherwise cooperating socket 36 (FIG. 3) providing for the attachment of the brace arm first member 32 to the attachment component 30. Brace arm attachment 30 also includes a lateral elongated slot 38, through which the transverse retaining pin 28 passes, to retain the brace arm attachment 30 within the channel 16.

Figure 3:
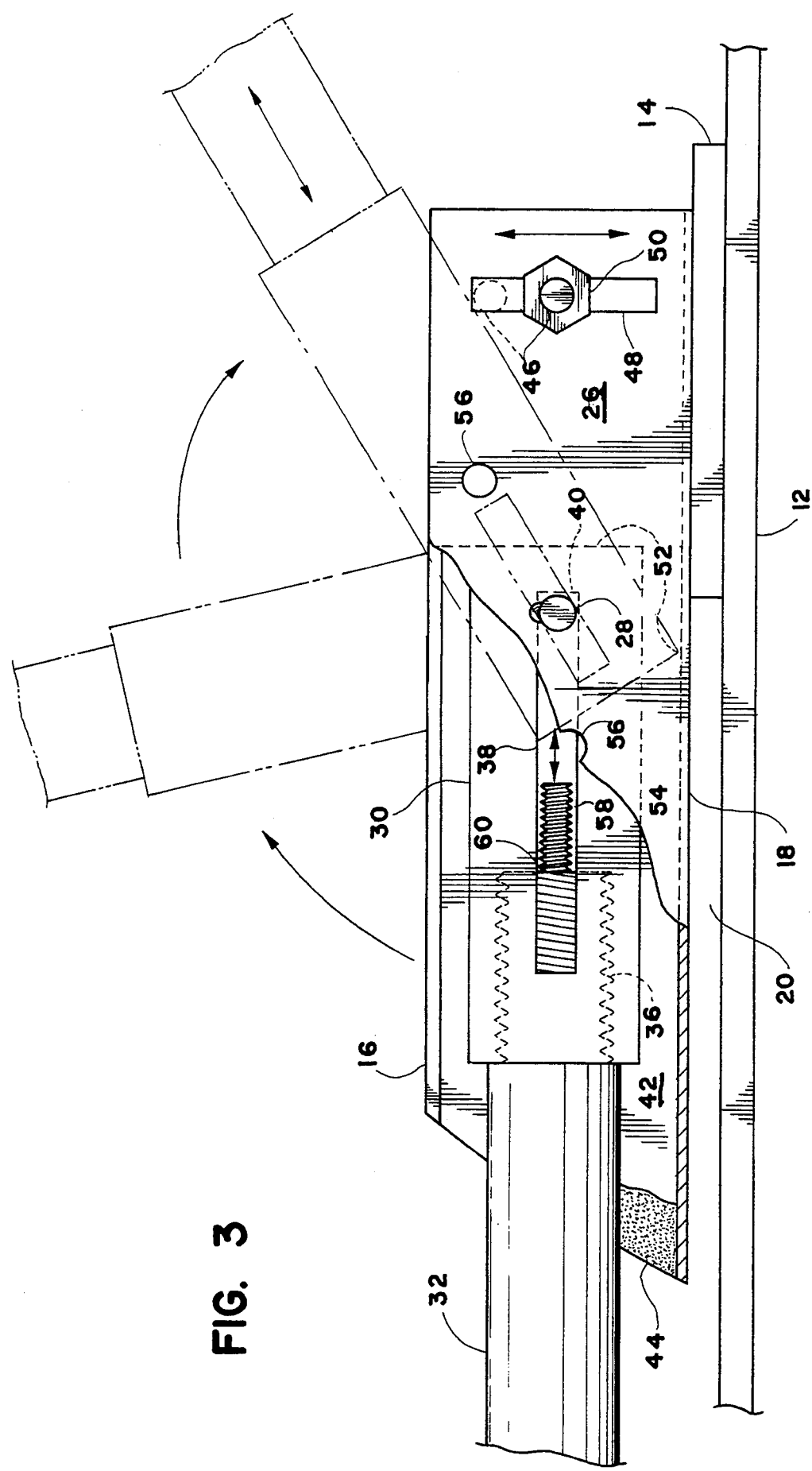
FIG. 3 is a side elevation view partially broken away, showing further construction and functional details.

The arcuate actuation of the brace arm 34 relative to the channel 16 is shown in FIG. 3. Normally, when the present arm steady brace 10 is secured upon a person for use, the brace arm 34 will be disposed vertically downward, or to the left side of FIG. 3 as shown by the solid lines, and will be suspended from the retaining pin 28 by the first end 40 of the elongated slot 38. Frictional detents 42 within the two sides or walls 24 and 26 of the channel 16 serve to prevent the arm attachment component 30, and thereby the arm 34, from swinging or moving within the channel 16, thereby reducing or eliminating any noise which might be produced by such action. A sheet of elastomeric material 44 is installed between each channel wall 24 and 26, and the respective frictional detent 42, to bias the detents 42 against the sides of the brace arm attachment component 30.

When the brace arm 34 is arcuately lifted from the channel 16 and placed to an outward and upward angle to serve as an arm brace, as shown in FIG. 1 and in the broken line representation to the upper right of FIG. 3, it will be seen that gravity will tend to cause the brace arm 34 and the attachment component 30 to slide downward along the elongated slot 38 and about the pin 28. The upward limit of angular motion of the brace arm 34 relative to the channel 16 is limited by an adjustable transverse stop pin 46 installed through elongated stop pin slots 48 in the two channel walls 24 and 26. The securing of the stop in 46 is provided by fasteners 50 (cooperating nuts, wing nuts, etc) on the threaded stop in 46.

The longitudinal limit of downward or inward movement of the brace arm attachment component 30, and thus the attachment arm 34, is defined by the point at which the first end 52 of the attachment component 30 contacts the inner surface 54 of the channel base 18, as shown in FIG. 3. This configuration of arcuately raising the brace arm 34 to its upward limit and then longitudinally sliding it inward toward the channel base 18, will also be seen to provide a lock means to secure the brace arm 34 arcuately with respect to the channel 16. When downward pressure is applied to the brace arm 34 in this configuration, arcuate downward movement is prevented by the corner of the first end 52 of the brace arm attachment component 30 being in contact with the inner surface 54 of the channel base 16. The retaining pin 28 now acts as a fulcrum in this configuration, as it is now disposed in an intermediate position within the elongated slot 38. As noted above, further upward arcuate movement of the arm 34 is stopped by the stop pin 46, thus locking the brace arm 34 in a cantilevered, upwardly and outwardly extended position. However, downward retraction of the brace arm is still easily achieved by pulling the brace arm 34 outwardly until the first end 40 of the slot 38 contacts the retaining pin 28, thereby providing clearance between the corner of the first end 52 of the attachment component 30 and the inner surface 54 of the channel base 18. The arm 34 may now be arcuately lowered and stowed in the downward position to be gripped by the frictional detents 42 in the channel walls 24 and 26, as discussed above. The above operation of the present invention will be seen to require the use of only one hand, to arcuately lift the brace arm 34 and allow it to slide longitudinally along the retaining pin 28 by means of the elongated slot 38 thereby to lock the arm 34 in an arcuately outward and upward position, and to retract the brace arm 34 by lifting it to the limit defined by the first end 40 of the slot 38 and the retaining pin 28 and allowing it to move arcuately downward to be captured between the frictional detents 42 in the channel walls 24 and 26. This single handed operation provides significant advantages for the physically handicapped, and/or to hunters using the present invention who must place the arm 34 in a cantilevered ready position while simultaneously holding a weapon or bracing themselves in a tree stand, or otherwise requiring use of their free hand. Further adjustment of the upwardly arcuate limits of the brace arm 34 are provided by a plurality of lateral holes 56 through which the brace arm attachment component retaining pin 28 may be selectively installed, and further by a threadibly adjustable stop screw 58 installed coaxially in the attachment end 60 of the first brace arm member 32, and within the elongated slot 38. Access for adjustment is provided by means of a hole (now shown) in the first end 52 of the attachment component 30. By removing the retaining pin 28, the access hole and stop screw 58 are readily accessible.

The brace arm 34 comprises a first hollow, tubular member 32 and a second concentric member 62 which telescopes into the first member 32 to provide adjustment in the length of the arm 34. The locking means for securing the brace arm 34 at a desired length is shown in FIG. 2. The threaded outer end 64 of the first arm member 32 includes a fixed collar 66 secured thereto and a threadibly adjustable locking collar 68 captured on the outer end 64 of the first arm member 32 by the fixed collar 66. A rocker 70 is pivotally installed to the fixed collar 66 by a rocker pivot pin 72 which passes generally through the midpoint of the rocker 70. The rocker 70 is equipped with a cam end 74 which bears against the conical face 76 of the locking collar 68, and an opposite arm engagement end 78 which selectively engages one of a plurality of circumferential grooves 80 spaced along the brace arm second member 62. The length of the brace arm 34 is adjusted by telescoping the two arm components 32 and 62 together or apart as desired, and threading the locking collar 68 toward the fixed collar 66 on the first arm member threaded end 64. As the conical face 76 of the locking collar 68 contacts the cam end 74 of the rocker 70, the opposite engagement end 78 of the rocker 70 will be forced against the side of the second brace arm member 62. A final, small adjustment of the overall length of the brace arm 34 may be needed to allow the engagement end 78 of the rocker 70 to slip into one of the circumferential grooves 80 along the second brace arm member 62. When this occurs, the locking collar 68 may be tightened further, to force the tip of the engagement end 78 of the rocker 70 into the selected groove 80 of the second brace arm member 62.

The above mechanism for securing the brace arm 34 at a selected length, still permits the two members 32 and 62 to rotate axially relative to one another, while positively locking the overall length of the arm 34 as desired. This is advantageous, as the second arm member 62 includes a second or arm rest end 82 having an arcuately shaped arm or wrist rest 84 fixedly attached thereto. The ability to rotate one arm brace member axially relative to the other brace member when they are locked at a specified length, allows the fixedly attached arm or wrist rest 84 (and the second arm brace member 62) to be rotated as desired to provide maximum comfort and support for the arm of a user of the present invention. The arm/wrist rest 84 may be padded for even further comfort, as desired.

The above described arm steady rest 10 will be seen to provide numerous advantages over the prior art for persons needing to hold steadily a large, heavy or bulky article by hand, particularly if it is required that the article be supported generally horizontally at some distance from the body by means of an extended or semi-extended arm. The present steady brace is particularly valuable for hunters, as the frictional retention of the brace arm attachment component 30 within the channel 16 by means of the frictional detents 42, prevents the swinging of the attachment component within the channel and any resultant noise which might thereby be produced. Assuming that the steady brace 10 is properly preadjusted, the user may lift the brace arm 34 outward and upward and lock it by means of the elongated slot 38 in the brace arm attachment component 30 into a locked cantilever position with a single hand, thereby allowing the user to hold another article in his/her opposite hand. The benefits thereby provided are further useful to the physically handicapped. The means provided to lock the telescoping brace arm members 32 and 62 at a desired length, and still permit relative axial rotation, further allow for single hand operation, as the length of the members 32 and 62 may be locked and the axial orientation of the arm or wrist rest 84 adjusted without need for other simultaneous adjustments.

It is to be understood that the present invention is not limited to the sole embodiment described above, but encompasses any and all embodiments within the scope of the following claims.

I claim:

1. A bodily attachable arm brace providing generally horizontal support for an arm of a user thereof, comprising:

a planar base portion;

an intermediate portion smaller than said planar base portion and secured thereto;

a channel comprising a channel base having an inner surface and two oppositely disposed side walls each having at least one passage therethrough, with said channel base secured to and extending outward from said intermediate portion, and said channel being parallel to said base portion and defining a slot therebetween;

a brace arm attachment component having a first end and an opposite second end and a lateral elongated slot therethrough;

a retaining pin installed through each said channel side wall passage and said brace arm attachment component elongated slot, thereby pivotally securing said brace arm attachment component within said channel;

a brace arm having opposite first and second ends, with said brace arm first end secured to said brace arm attachment component second end, and said brace arm second end having an arm rest secured thereto; and means providing for the attachment of said arm brace to a user of said arm brace, said attachment means comprising a plurality of holes through said base portion and plural ties passing through said base portion holes and securable about said user of said arm brace;

whereby, upward and outward locking cantilever extension of said brace arm is provided by means of arcuately raising said brace arm upward and outward in a single motion to allow said brace arm attachment component to drop downward within said channel by means of said elongated slot around said retaining pin, thereby lockingly biasing said brace arm attachment component first end against said inner surface of said channel base, and whereby reversal of the locking cantilever extension is provided by lifting said brace arm upward and arcuately lowering said brace arm downward in a single motion.

2. The arm brace of claim 1 including:

stop means limiting the upwardly arcuate movement of said brace arm attachment component.

3. The arm brace of claim 2 wherein:

said stop means comprising an elongated stop pin slot through each of said channel first and second walls; and a stop pin adjustably secured through said channel first and second wall elongated stop pin slots, whereby said stop pin provides selective positioning within said stop pin slots to provide said stop means.

4. A bodily attachable arm brace providing generally horizontal support for an arm of a user thereof, comprising:

a planar base portion;

an intermediate portion smaller than said planar base portion and secured thereto;

a channel comprising a channel base having an inner surface and two oppositely disposed side walls each having at least one passage therethrough, with said channel base secured to and extending outward from said intermediate portion, and said channel being parallel to said base portion and defining a slot therebetween;

a brace arm attachment component having a first end and an opposite second end and a lateral elongated slot therethrough;

a retaining pin installed through each said channel side wall passage and said brace arm attachment component elongated slot, thereby pivotally securing said brace arm attachment component within said channel;

a cantilevered brace arm having opposite first and second ends, with said brace arm first end secured to said brace arm attachment component second end, and said brace arm second end having an arm rest secured thereto; and means providing for the angular adjustment of locking cantilevered extension of said brace arm, whereby, upward and outward locking cantilever extension of said brace arm is provided by means of arcuately raising said brace arm upward and outward in a single motion to allow said brace arm attachment component to drop downward within said channel by means of said elongated slot around said retaining pin, thereby lockingly biasing said brace arm attachment component first end against said inner surface of said channel base, and whereby reversal of the locking cantilever extension is provided by lifting said brace arm upward and arcuately lowering said brace arm downward in a single motion.

5. The arm brace of claim 4 wherein:

said angular adjustment means of said brace arm locking cantilever extension comprises a plurality of pairs of retaining pin holes in said channel first and second walls, whereby;

said retaining pin is selectively installed through one of said pairs of retaining pin holes and through said elongated slot of said brace arm attachment component to adjust the position of said brace arm attachment component within said channel.

6. The arm brace of claim 4 wherein:

said angular adjustment means of said brace arm locking cantilever extension comprises a threadibly adjustable screw coaxially installed in said brace arm first end and extending into said brace arm attachment component elongated slot, whereby;

said adjustable screw contacts said retaining pin in said elongated slot when said brace arm attachment component is moved about said retaining pin thereby to limit the range of motion provided by said brace arm attachment component elongated slot.

7. A bodily attachable arm brace providing generally horizontal support for an arm of a user thereof, comprising:

a planar base portion;

an intermediate portion smaller than said planar base portion and secured thereto;

a channel comprising a channel base having an inner surface and two oppositely disposed side walls each having at least one passage therethrough, with said channel base secured to and extending outward from said intermediate portion, and said channel being parallel to said base portion and defining a slot therebetween;

a brace arm attachment component having a first end and an opposite second end and a lateral elongated slot therethrough;

a retaining pin installed through each said channel side wall passage and said brace arm attachment component elongated slot, thereby pivotally securing said brace arm attachment component within said channel;

a brace arm having opposite first and second ends, with said brace arm first end secured to said brace arm attachment component second end, and said brace arm second end having an arm rest secured thereto; and means biasing said brace arm attachment component within said channel, said biasing means comprising a frictional detent within each said channel wall, with each said frictional detent frictionally bearing against said brace arm attachment component, whereby, upward and outward locking cantilever extension of said brace arm is provided by means of arcuately raising said brace arm upward and outward in a single motion to allow said brace arm attachment component to drop downward within said channel by means of said elongated slot around said retaining pin, thereby lockingly biasing said brace arm attachment component first end against said inner surface of said channel base, and whereby reversal of the locking cantilever extension is provided by lifting said brace arm upward and arcuately lowering said brace arm downward in a single motion.

8. The arm brace of claim 7 including:

elastomer sheet material disposed between each said frictional detent and each said channel wall, whereby;

said elastomer sheet material urges each said frictional detent against said brace arm attachment component.

9. The arm brace of claim 1 wherein:

said brace arm comprises a hollow tubular first member having opposed first and second ends, and a second member having opposed first and second ends and telescopingly disposed within said hollow tubular first member.

10. The arm brace of claim 9 including:

an arm rest installed on said second end of said brace arm second member.

11. The arm brace of claim 9 including:

means providing for the axial locking of said brace arm second member relative to said brace arm first member.

12. The arm brace of claim 11 wherein:

said axial locking means allows the radial rotation of said brace arm second member within said brace arm first member when said brace arm first member and said brace arm second member are axially locked.

13. The arm brace of claim 11 wherein:

said axial locking means comprises an adjustable locking collar threadibly installed on said brace arm first member second end and a fixed collar installed on said brace arm first member second end and capturing said adjustable locking collar thereon;

said fixed collar including a rocker pivotally installed thereon, with said rocker having a cam end and an opposed engagement end, and;

said brace arm second member includes a plurality of circumferential grooves therein, whereby;

said brace arm second member is axially adjusted relative to said brace arm first member and said adjustable locking collar is threadibly adjusted to bear against said cam end of said rocker, with said opposed engagement end of said rocker thereby engaging one of said plurality of circumferential grooves in said brace arm second member to axially lock said brace arm first member and said brace arm second member together and allowing said brace arm second member to radially rotate within said brace arm first member by means of said one of said circumferential grooves engaged by said engagement end of said rocker permitting radial rotation relative to said rocker engagement end.

* * * * *